May 5, 1942.  O. STEINER  2,282,263
CAMERA WITH DIRECT-VISION VIEW-FINDER
Original Filed Dec. 15, 1939   2 Sheets-Sheet 1

Inventor:
Oscar Steiner,
By Emery, Booth, Townsend, Miller and Neidner,
Attys.

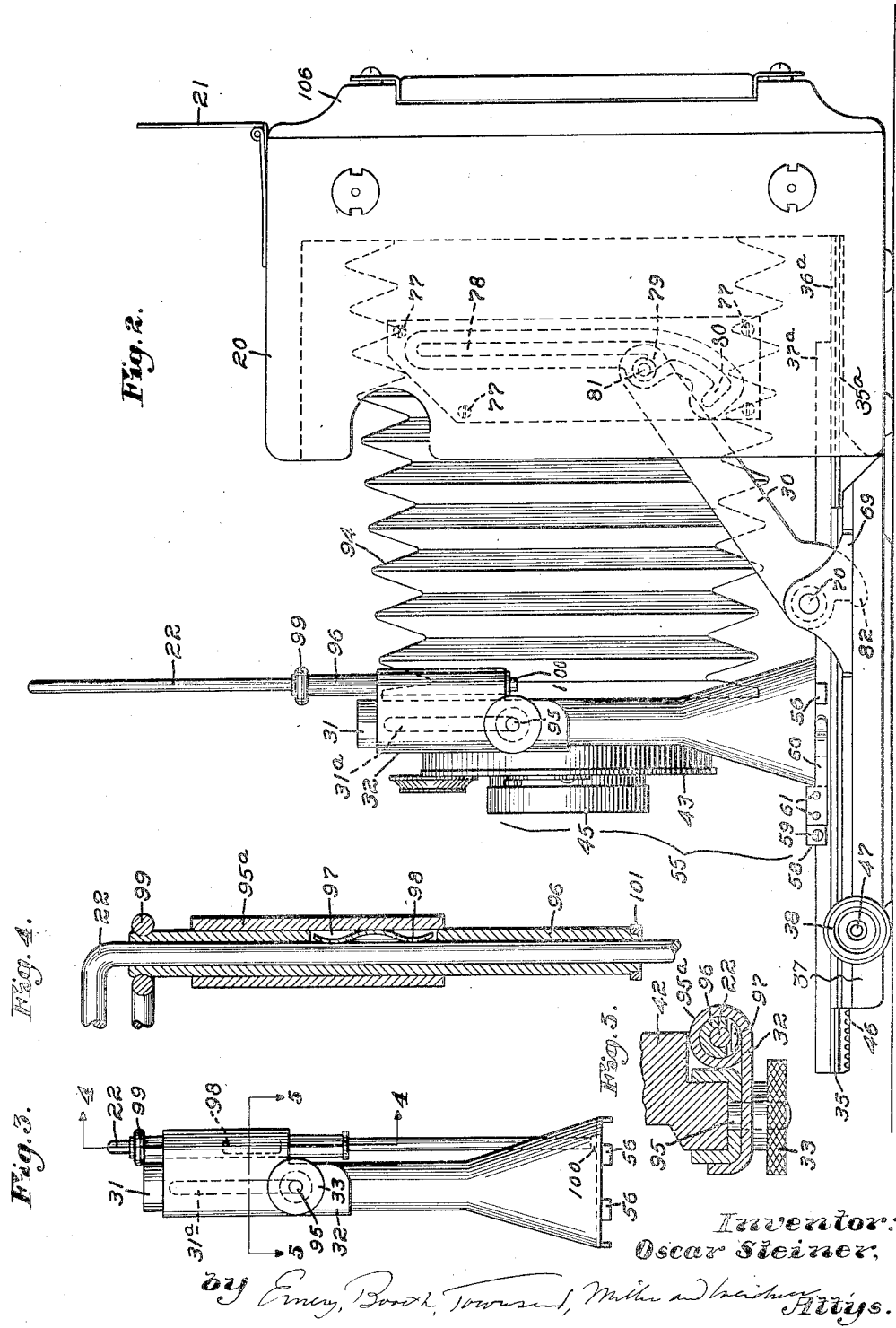

Patented May 5, 1942

2,282,263

UNITED STATES PATENT OFFICE 2,282,263

CAMERA WITH DIRECT-VISION VIEW FINDER

Oscar Steiner, Irondequoit, N. Y., assignor to The Folmer Graflex Corporation, Rochester, N. Y., a corporation of Delaware Original application December 15, 1939, Serial No. 309,385. Divided and this application April 5, 1941, Serial No. 387,050

16 Claims.  (Cl. 33—64)

This application is a division of my co-pending application Ser. No. 309,385, filed December 15, 1939.

This invention relates to direct-vision viewfinders for cameras.

In order that the principle of the invention may be readily understood, I have disclosed a single embodiment thereof in the accompanying drawings wherein—

Fig. 2 is a side elevation of a camera opened out for use and showing the said view finder;

Fig. 3 is a side elevation of the camera yoke showing the wire frame finder in the collapsed condition;

Fig. 4 is a longitudinal section taken through Fig. 3 on the line 4—4 of Fig. 3; and Fig. 5 is a detail in horizontal section taken on the line 5—5 of Fig. 2.

Figure 1:
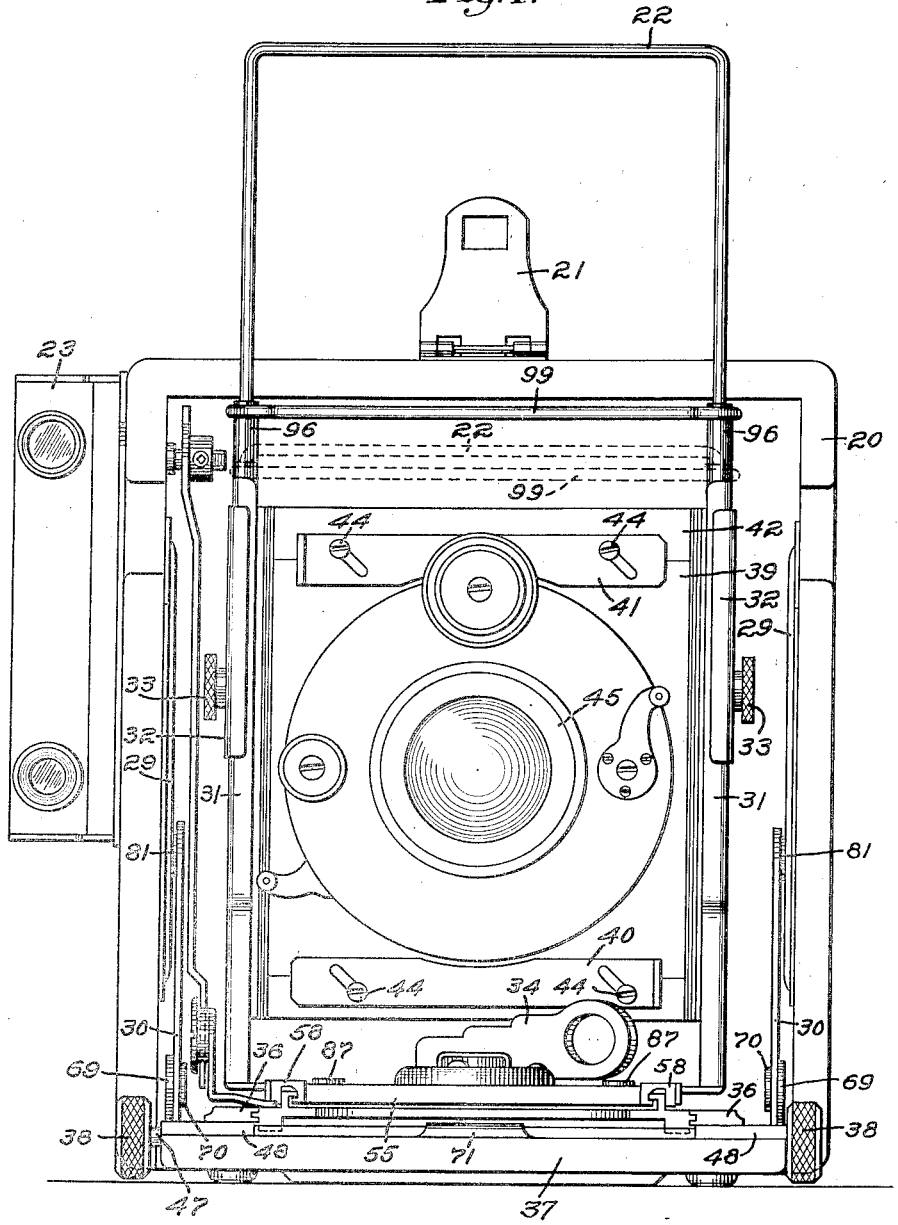
Fig. 1 is a front elevation of a camera, with the direct-vision view-finder in position for use.

Referring first to Figs. 1 and 2 disclosing the general structure of the camera which, except as herein indicated, and to which or to any other suitable camera my invention may be applied, may be of any suitable structure,—the camera box is indicated at 20 in Figs. 1 and 2. It may be of the general Graphic type of The Folmer Graflex Corporation that is provided with a focal plane shutter, or it may be of any other suitable type. The view finder peep-sight is indicated at 21 and the wire frame finder at 22. A range finder which, so far as this application is concerned, may be of any suitable type, but which is preferably of the type shown in my co-pending application Ser. No. 311,568, filed December 29, 1939, is indicated at 23. The side guide plates are indicated at 29, 29, and the camera side arms at 30, 30.

In the several figures, the camera yoke channels are indicated at 31, having slots 31a, 31a, best shown in Fig. 2. View finder brackets or bracket-like members are indicated at 32, 32 as held to the yoke channels by means of nuts 33, 33. The camera front frame assembly is provided with a clamping handle or lever 34, shown in Fig. 1.

The camera is provided with a track made up of the main body or forward part 35 and the attached rear part 35a for which are respectively provided guides 36, 36 and 36a, 36a, wherein the said track parts are free to slide. The camera bed, which underlies the said track members, is indicated at 37 and the focusing knobs are indicated at 38, 38 in Figs. 1 and 2. The lens board is indicated at 39. It is provided with a lower lens-board latch 40 and an upper lens-board latch 41. The bellows frame is indicated at 42, and the between-the-lens shutter is indicated at 43. The said shutter is normally mounted on the lens board 39, which is held in place in the camera bellows frame 42 under the influence of the said latches 40, 41, which are attached to the said bellows frame 42 by screws 44, 44. The means provided for effecting the vertical adjustment of the said bellows frame will be fully described at a later point. The camera or objective lens is indicated at 45.

The camera track of the camera, to which this direct-vision view finder is applied but to which type of camera my invention is not restricted, is composed of the two members 35, 35a pivotally attached together. These two parts or members of the camera track are always coupled together, preferably by hinge construction, thus pivotally connecting them together along transverse edges extending transversely to the direction of in-and-out movement of said two-part track.

The said two-part track need not be herein particularly described, it being more fully disclosed and particularly claimed in my application Ser. No. 309,385, of which this application is a division. It is sufficient here to state that the forward track member 35 is provided with gear teeth 46, 46 and the focusing knobs 38, 38 are fast on a through shaft 47 which extends through holes (not shown) in the bolsters 48, 48. The said through shaft 47 is also provided with pinions (not shown) for meshing with the gear teeth 46, 46 of the forward track member 35.

The said camera front frame or assembly 55 is provided with guides 56, 56, which overlie the outside edge of the track rails 57, 57 of the forward track member 35. Attached to the said track rails 57, 57 are infinity stop blocks 58, 58, shown in Figs. 1 and 2 as locked to the track rails 57, 57 by screws 59, 59. The said infinity stop blocks are provided with springs 60, 60, attached to the respective infinity blocks by screws 61, 61, that overlie the forward turned-down guides 56, 56, thus holding the camera front frame or assembly 55 in position upon the forward track member 35 even though the clamp handle or lever 34 is in the released position. The metal camera bed 37 has upwardly extending lips on the sides forming bosses 69, 69, as shown in Fig. 1. Thereto are attached the two camera side arms 30 by means of rivets 70, 70.

As best shown in Fig. 2, the camera case 20 is provided with side arm guide plates or brackets 29, 29, previously referred to, one being on either side of the camera case and held to the camera walls by screws 77, 77, shown in dotted lines in Fig. 2. Each side arm plate or bracket 29 is provided with a slot 78 having laterally extending angular slot portions 79, 80, shown in dotted lines in Fig. 2. The said side arms 30, previously referred to, are provided with shoulder rivets 81, 81, riding in the respective slots 78. When the entire camera bed is in the closed position, each side arm shoulder rivet 81 will be in position near the top of the respective slot 78, and when the entire camera bed 37 is in the horizontal position, said rivets will be in the position shown in Fig. 2, and when the bed 37 is lowered to the wide angle position, each shoulder rivet 81 will be in the lowermost notches 80.

In Fig. 2, the camera is shown with the bed 37 thereof in a horizontal position, the camera bellows 94 being extended and the wire finder 22 and the peep-sight 21 being both in operating position. The structure of the said wire finder is clearly shown in the several figures, and particularly Figs. 3 to 5 disclosing the preferred embodiment of my invention to which, however, my invention is not limited. Referring first to Figs. 1 and 2, the bellows frame 42 is provided with two laterally extending studs 95, 95, one of which is also shown in Fig. 3. Onto the said studs are threaded the nuts 33, 33, shown also in Fig. 1. The upright side rails 31, 31 are provided with slots 31a, 31a, as indicated in dotted lines in Fig. 3. This construction provides for a vertical adjustment of the bellows frame 42 which, as previously stated, carries the objective lens 45. The view finder brackets or members 32, 32 in this embodiment of my invention have holes provided to slide over the said studs 95, 95, as shown in Fig. 5, and are held in place by the said threaded nuts 33, 33. Any movement of the bellows frame 42 up or down causes a like movement of the view finder brackets or members 32, 32. Therefore, if the front of the camera is raised, thereby raising the center of the objective lens 45, the view finder itself is also raised, thereby correcting the view as seen through the view finder.

Each view finder bracket or member 32 is so shaped that it fits over the adjacent side rail 31 and the rear portion thereof in this embodiment of my invention is formed into a cylinder or tube 95a, as clearly shown in vertical section in Fig. 4 and in transverse section in Fig. 5. In each said cylindrical or tubular portion 95a slides a second cylinder or tube 96 having a cut-out portion 97 in which lies a spring 98 having a wave-shaped formation, and which, as best shown in Fig. 4, exerts a pressure against the cylindrical or tubular portion 95 and the wire frame member 22, thus holding said parts 22, 96 in any position in the cylindrical or tubular portion 95a of the said wire frame member 22. Attached to each said cylindrical or tubular member 96 is a second wire cross member 99, shown in Fig. 1, and forming the lower portion of the view finding frame.

It will be observed that the described construction provides a very rigid, wire frame, view finder that can be collapsed when closing the camera and can be raised to operating position and automatically held in place. The lower end of the view finder member 22 is headed over as illustrated at 100 in Fig. 3. The lower end of each cylinder or tube 96 has riveted thereon a stop collar 101, as most clearly shown in Fig. 4. There are thus provided two stops in the same horizontal plane which co-act when the view finder is pulled all the way up. In Fig. 1, the wire finder is shown in full lines in fully elevated position and in dotted lines in the collapsed position.

In the operation of the camera, it is necessary first to open out the camera bed 37 which forms the door of the camera, and for taking pictures with a lens of normal focal length the said bed 37 is allowed to stop in a horizontal position. The camera front frame or assembly 55 carrying the camera or objective lens 45 will be in position all the way back in the camera box 20. The clamping handle or lever 34 will then be turned so as to be released. The camera front frame or assembly 55 can then be pulled out on the track rails 57, 57 to a position where the said front frame assembly 55 will be stopped against infinity stops 58, 58 and will be held in position by the springs 60, 60. The clamping handle or lever 34 is then turned, thus clamping the said front frame or assembly 55 to the camera forward track member 35. Then normal focusing takes place through the act of turning the focusing knobs 38 either forward or backward depending on the direction in which it is necessary to move the objective lens 45.

To close the camera again, the focusing knobs 38, 38 are turned all the way back until the rear track member 35a is in the extreme back position in the camera box 20. The wire frame finder is collapsed by pushing the members thereof downward into the folded position. The front frame assembly 55 is then pushed back into the camera box 20. The clamping handle or lever 34 is turned, thus clamping the camera front frame or assembly 55 and holding the bellows 94 compressed or compacted in the camera box 20. The door thereof can then be closed by depressing the side arms 40, 40 to the fullest extent possible, and turning the camera bed 37 upward into full vertical position, where it latches.

The wire frame finder presents novel structure that is compact and rigid, and which may be readily brought into its various required positions, and particularly with respect to the vertical positioning of the camera front frame or assembly.

Having thus described one illustrative embodiment of the invention, it is to be understood that although specific terms are employed, they are used in a generic and descriptive sense and not for purposes of limitation, the scope of the invention being set forth in the following claims.

I claim:

1. In a photographic camera structure, a view finder of substantially rectangular form having sides, top and bottom, said view finder being supported upon the bellows frame of the camera and collapsible into closed position when not in use and extensible to permit of direct vision of the object to be photographed, the view finder structure having, for the purpose stated opposite supporting tubes for the said sides of the view finder.

2. In a photographic camera structure, a view finder of substantially rectangular form having sides, top and bottom, said view finder being supported upon the bellows frame of the camera and collapsible into closed position when not in use and extensible to permit of direct vision of the object to be photographed, said view finder and its support including lateral studs upon the bellows frame, upright side rails, brackets 32, 32 for said view finder having cylindrical parts, supporting tubes 96 within said cylindrical parts and wherein the sides of the view finder are received, the bellows frame being movable up and down to move the objective lens correspondingly, the view finder frame being movable up and down therewith.

3. In a photographic camera structure, a view finder of substantially rectangular form having sides, top and bottom, said view finder being supported upon the bellows frame of the camera and collapsible into closed position when not in use and extensible to permit of direct vision of the object to be photographed, the bellows frame being movable up and down and having wire finder brackets connected thereto and provided with cylindrical portions and tubes supported in said cylindrical portions and receiving the sides of said view finder.

4. In a photographic camera structure, a view finder of substantially rectangular form having sides, top and bottom, said view finder being supported upon the bellows frame of the camera and collapsible into closed position when not in use and extensible to permit of direct vision of the object to be photographed, the bellows frame being movable up and down and having wire finder brackets connected thereto and provided with cylindrical portions, and tubes supported in said cylindrical portions and receiving the sides of the said view finder, the bellows frame having lateral studs 95, 95 secured thereto and extending through said view finder brackets, the latter being slotted to permit movement of said studs with the bellows frame.

5. In a photographic camera structure, a view finder of substantially rectangular form having sides, top and bottom, said view finder being supported upon the bellows frame of the camera and collapsible into closed position when not in use and extensible to permit of direct vision of the object to be photographed, the bellows frame having brackets 32, 32 attached thereto, and having tubular portions wherein the sides of the view finder are received, tubes interposed between said view finder sides and the inner walls of said tubular parts, and spring means associated with said tubes to hold the view finder in desired position of up and down adjustment.

6. In a photographic camera structure, a view finder of substantially rectangular form having sides, top and bottom, the said top and sides being composed of a wire bent to form such structure, and the said bottom consisting of a transversely extending wire supported at opposite sides of the front frame assembly of the camera, and upright supporting tubes at opposite sides of the said front frame assembly and in which the side-forming wires of the view finder are supported for up and down sliding movement.

7. A view finder according to claim 6, but in which the said supporting tubes are supported upon the upright sides of the front frame assembly.

8. A view finder according to claim 6, but in which the said supporting tubes are adjustably supported for up and down adjusting movement with the bellows frame of the camera.

9. A view finder according to claim 6, but in which the said supporting tubes are adjustably supported for up and down adjusting movement with the bellows frame of the camera, and for which purpose the said bellows frame is provided at its sides with brackets in which the said supporting tubes are received.

10. A view finder according to claim 6, but in which the said supporting tubes are adjustably supported for up and down adjusting movement with the bellows frame of the camera, and for which purpose the said bellows frame is provided at its sides with brackets in which the said supporting tubes are received, and in which combination the transversely extending bottom wire of the said view finder is carried by the upper ends of said supporting tubes.

11. A combination according to claim 5, but in which the said tubular portions of the brackets 32, 32 are formed integral therewith and as an extension thereof.

12. A combination according to claim 5, but in which the spring means associated with each of said tubes consists of a member 98 having a wave shaped formation to exert lateral spring pressure.

13. A combination according to claim 5, but in which the brackets 32, 32 are provided with holes to slide over studs laterally extending from the upright side rails of the said bellows frame.

14. For use in a photographic camera structure having a bellows frame which is movable to and fro along the camera bed and is also adjustable up and down with respect to said camera bed,—a wire view finder of substantially rectangular form having wire sides, top and bottom, said wire view finder being supported upon the said bellows frame of the camera and collapsible into closed position when not in use and extensible to permit of direct vision of the object to be photographed, opposite bracket-like members connected to the said bellows frame, and upright tubes supported by said bracket-like members respectively, the wire sides of the view finder being telescopically received in said upright tubes respectively for up and down sliding movement therein.

15. A wire view finder according to claim 14, but in which the said bottom of the wire view finder consists of a transversely extending wire supported at opposite sides of the said bellows frame by said upright tubes respectively.

16. A wire view finder according to claim 14, but in which the said upright tubes are constituted by lateral, integral prolongations of said bracket-like members, such prolongations being respectively rolled upon themselves to constitute sufficiently complete tubes to receive the upright wire sides of the view finder.

OSCAR STEINER.